(12) United States Patent
Blythe

(10) Patent No.: US 7,719,519 B2
(45) Date of Patent: May 18, 2010

(54) INPUT DEVICE WHICH EMITS AND/OR REFLECTS OPTICAL ELECTROMAGNETIC RADIATION FOR USE ON A DISPLAY SCREEN

(75) Inventor: Michael M. Blythe, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1363 days.

(21) Appl. No.: 11/166,947

(22) Filed: Jun. 24, 2005

(65) Prior Publication Data

US 2006/0290674 A1    Dec. 28, 2006

(51) Int. Cl.
*G09G 5/08* (2006.01)
*G06F 3/033* (2006.01)
(52) U.S. Cl. .................. 345/166; 345/156; 345/163
(58) Field of Classification Search ......... 345/156–178; 348/744–789; 359/443, 453, 456, 457, 460
See application file for complete search history.

(56) References Cited

U.S. PATENT DOCUMENTS

| | | | |
|---|---|---|---|
| 4,831,736 A | 5/1989 | Bryant, Sr. | |
| 5,124,509 A * | 6/1992 | Hoendervoogt et al. | 178/20.04 |
| 5,260,696 A | 11/1993 | Maynard, Jr. | |
| 5,355,148 A | 10/1994 | Anderson | |
| 5,400,054 A | 3/1995 | Dorst | |
| 5,436,639 A * | 7/1995 | Arai et al. | 345/156 |
| 5,502,514 A * | 3/1996 | Vogeley et al. | 348/771 |
| 5,508,719 A | 4/1996 | Gervais | |
| 5,555,894 A | 9/1996 | Doyama et al. | |
| 5,577,848 A | 11/1996 | Bowen | |
| 5,691,747 A | 11/1997 | Amano | |
| 5,706,026 A | 1/1998 | Kent et al. | |
| 5,754,168 A | 5/1998 | Maynard, Jr. | |
| 5,760,764 A | 6/1998 | Martinelli | |
| 5,818,421 A * | 10/1998 | Ogino et al. | 345/157 |
| 5,838,306 A * | 11/1998 | O'Connor et al. | 345/163 |
| 6,031,519 A | 2/2000 | O'Brien | |
| 6,034,627 A * | 3/2000 | Wei | 341/20 |
| 6,069,614 A | 5/2000 | Singhal | |
| 6,094,190 A | 7/2000 | Kodim | |
| 6,100,538 A * | 8/2000 | Ogawa | 250/559.29 |
| 6,124,845 A | 9/2000 | Toda et al. | |
| 6,208,328 B1 | 3/2001 | Kawachiya et al. | |
| 6,215,478 B1 | 4/2001 | Yeh et al. | |
| 6,292,113 B1 | 9/2001 | Wu | |
| 6,307,465 B1 | 10/2001 | Kayama et al. | |
| 6,337,919 B1 | 1/2002 | Dunton | |
| 6,369,797 B1 | 4/2002 | Maynard, Jr. | |
| 6,590,564 B1 | 7/2003 | McLoone et al. | |
| 6,624,833 B1 | 9/2003 | Kumar et al. | |
| 6,844,871 B1 * | 1/2005 | Hinckley et al. | 345/163 |
| 6,950,091 B2 * | 9/2005 | Wilson | 345/158 |
| 7,116,309 B1 * | 10/2006 | Kimura et al. | 345/105 |
| 2002/0101418 A1 * | 8/2002 | Vernier et al. | 345/418 |
| 2002/0109672 A1 * | 8/2002 | Kehlstadt et al. | 345/157 |
| 2002/0186351 A1 * | 12/2002 | Gnanamgari et al. | 353/42 |
| 2004/0075640 A1 * | 4/2004 | Liao | 345/156 |
| 2004/0140963 A1 * | 7/2004 | Kim et al. | 345/179 |
| 2005/0073508 A1 * | 4/2005 | Pittel et al. | 345/175 |
| 2005/0179652 A1 * | 8/2005 | Ludwig | 345/156 |
| 2006/0109199 A1 * | 5/2006 | Yee et al. | 345/1.3 |

\* cited by examiner

*Primary Examiner*—Sumati Lefkowitz
*Assistant Examiner*—Robert E Carter, III

(57) ABSTRACT

Embodiments of an input device are disclosed.

4 Claims, 3 Drawing Sheets

INPUT DEVICE WHICH EMITS AND/OR REFLECTS OPTICAL ELECTROMAGNETIC RADIATION FOR USE ON A DISPLAY SCREEN

BACKGROUND

Input devices are generally used by persons to provide information or commands to an electronic device. Existing input devices may be too complex, may not be suited for use with particular types of electronic devices and may be difficult to use.

DETAILED DESCRIPTION OF EXAMPLE EMBODIMENTS

Figure 1:
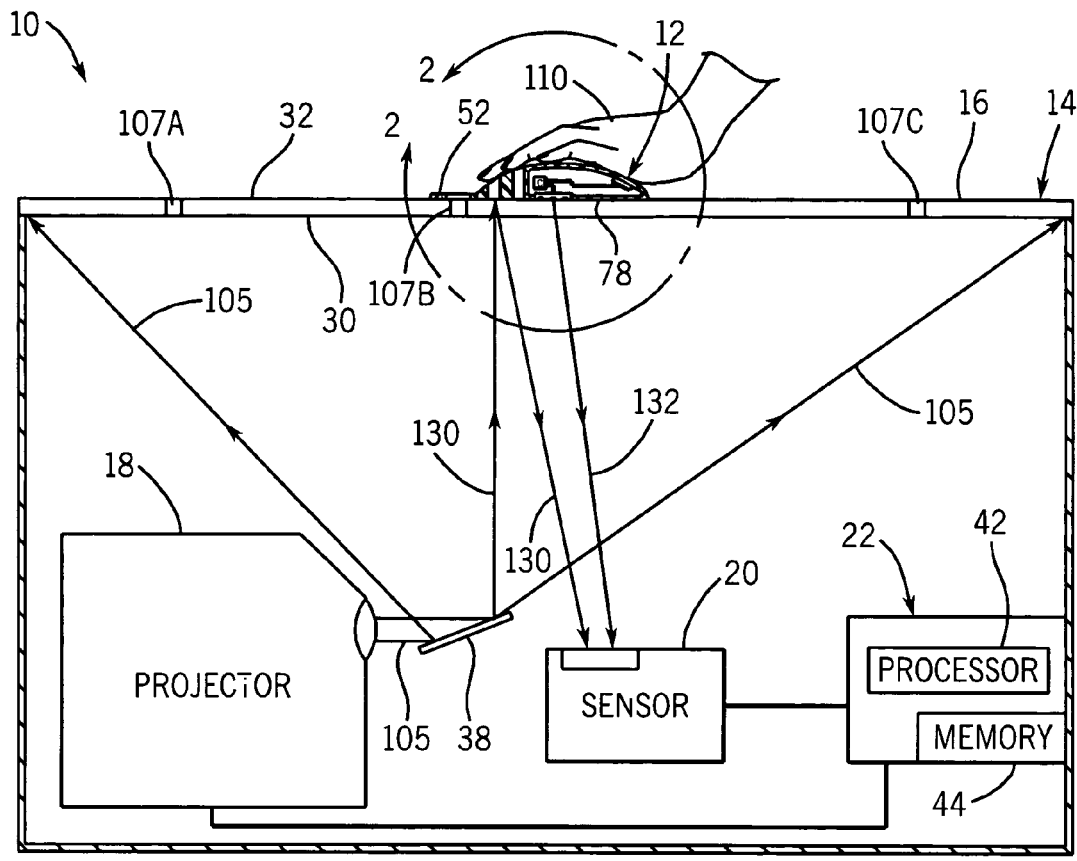
FIG. 1 is a sectional view schematically illustrating an embodiment of an interaction system according to one exemplary embodiment.

FIG. 1 schematically illustrates interactive system 10 which generally includes input device 12 and receiving device 14. Input device 12 generally comprises a device configured to give off optical electromagnetic radiation based upon interaction with a person. For purposes of this disclosure, the term "give off" or "given off" shall mean radiation that is generated, originates or emanates from the device or surface as well as radiation that is reflected off of a device or surface. For purposes of this disclosure, the term "optical electromagnetic radiation" shall mean the entire electromagnetic radiation spectrum excluding radio waves and microwaves. Optical electromagnetic radiation is generally electromagnetic radiation having a wavelength of less than about 10 Angstroms which generally includes infrared, visible, ultraviolet, X-rays and gamma rays. For purposes of this disclosure, the term "light" shall mean that portion of the electromagnetic spectrum extending from the near-ultraviolet region of approximately 0.3 micrometer wavelength, through the visible region, and into the mid-infrared region to about 30 micrometers. For purposes of this disclosure, the term "visible light" or "visual light" shall mean electromagnetic radiation in the visible spectrum nominally covering the wavelength range of 0.4 micrometers to 0.7 micrometers.

In the particular example shown, input device 12 is configured to give off different optical electromagnetic radiation based upon interaction with a person's hand. In the particular example shown, input device 12 is further configured to be moved or repositioned along receiving device 14 by the person's hand. In one embodiment, input device 12 is configured to be lifted and placed on or against receiving device 14. In another embodiment, input device 12 may be configured to slide, roll or otherwise move along one or more surfaces of receiving device 14 while in contact with receiving device 14.

In the particular embodiment shown, input device 12 is configured to both reflect optical electromagnetic radiation and to generate and emit optical electromagnetic radiation in response to interaction with a person's hand. In other embodiments, input device may be configured to either generate or emit electromagnetic radiation or differently reflect electromagnetic radiation based upon interaction with a person's hand or other portions of a person's body.

Receiving device 14 generally comprises a device configured to operate in response to optical electromagnetic radiation given off by input device 12 based upon interaction with a person. In the particular example shown, receiving device 14 generally includes screen 16, projector 18, sensor 20 and controller 22. Screen 16 comprises a component configured to provide a surface upon or against which input device 12 may be positioned and through which optical electromagnetic radiation may pass to sensor 20. In the particular example shown, screen 16 is further configured to receive light projected from projector 18 to provide a surface upon which images may be formed. In the example shown, screen 16 comprises one or more layers configured to scatter light from projector 18 such that light received from projector 18 on a first side of screen 16 may be viewed on a second opposite side of screen 16. In one embodiment, screen 16 comprises frosted glass. In one embodiment, screen 16 comprises a screen commercially available from Da-Lite Screen Company of Warsaw, Ind., under the trade name Da-100.

Screen 16 includes a first surface 30 facing projector 18 and a second opposite surface 32 facing outward. Surface 32 is configured to facilitate interaction with input device 12. In the particular example shown, surface 32 is supported and arranged in a substantially horizontal orientation, enabling input device 12 to rest upon surface 32. Although surface 32 of screen 16 are illustrated as being substantially horizontal, surface 32 may alternatively be supported at other orientations. For example, surface 32 may alternatively be inclined, declined or vertical. In other embodiments, surface 32 may be convex or concave. Although surfaces 30 and 32 are illustrated as being substantially parallel to one another, surfaces 30 and 32 may alternatively have other shapes or configurations. Although screen 16 is illustrated as being positioned between input device 12 and projector 18, in other embodiments, screen 16 may alternatively be arranged such that projector 18 projects light onto surface 32 with object 12 supported between surface 32 and projector 18. In such an alternative embodiment, receiver 14 may include an additional source of optical electromagnetic radiation for directing and reflecting optical electromagnetic radiation off of input device 12. In still other embodiments in which input device 12 emanates or generates optical electromagnetic radiation based upon interaction with a person, such an additional source of optical electromagnetic radiation may be omitted. In other embodiments, screen 16 may alternatively comprise an internally reflective substrate, such as glass or plastic, through which images are transmitted. Examples of such include wedge screen technology.

Projector 18 comprises a device configured to project visual light towards screen 16 so as to form an image upon screen 16. Projector 18 also serves as a source of optical electromagnetic radiation that is reflected off of input device 12, wherein the reflected optical electromagnetic radiation is sensed by sensor 20. In the particular example illustrated, projector 18 projects visual light which is first reflected off of mirror 38 to redirect the light towards screen 16. In other embodiments, projector 18 may alternatively be configured to direct light towards screen 16, enabling mirror 38 to be omitted. In still other embodiments, other optic devices may be used to transmit light from projector 18 onto screen 16. In the embodiment shown, projector 18 comprises a digital light processing (DLP) projector. In other embodiments, projector 18 may comprise other forms of projectors.

Sensor 20 comprises a device configured to receive and sense optical electromagnetic radiation given off by input device 12. Based upon the sensed optical electromagnetic radiation, sensor 20 transmits signals to controller 22. In the particular example shown, sensor 20 is configured to sense light and more particularly visual light given off input device 12. In the particular example shown, sensor 20 senses visual light that is both reflected from input device 12 and that is emitted from device 12. In one embodiment, sensor 20 comprises a digital camera. In other embodiments, sensor 20 may comprise other forms of sensors.

Controller 22 comprises a device in communication with sensor 20 and configured to generate control signals based at least in part upon signals from sensor 20. In the example shown, controller 22 is further configured to generate control signals which direct operation of projector 18 and sensor 20. Controller 22 includes processor 42 and memory 44. Processor 42 comprises a processor unit. For purposes of this disclosure, the term "processor unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 22 is not limited to any specific combination of hardware circuitry and software, nor to any particular source for the instructions executed by the processing unit. In the particular example shown, processor 42 is specifically configured to generate control signals for the direction of projector 18 and other components (not shown) of receiver 14 based upon signals from sensor 20 and based upon instructions stored in memory 44.

Memory 44 comprises a computer readable medium associated with processor 42 and configured to provide instructions for processor 42. In one embodiment, memory 44 may comprise random access memory (RAM). In another embodiment, memory 44 may comprise a mass storage device or some other persistent storage. In still other embodiments, hardwired circuitry may be used in place of or in combination with software instructions to direct the operation of processor 42.

Figure 2:
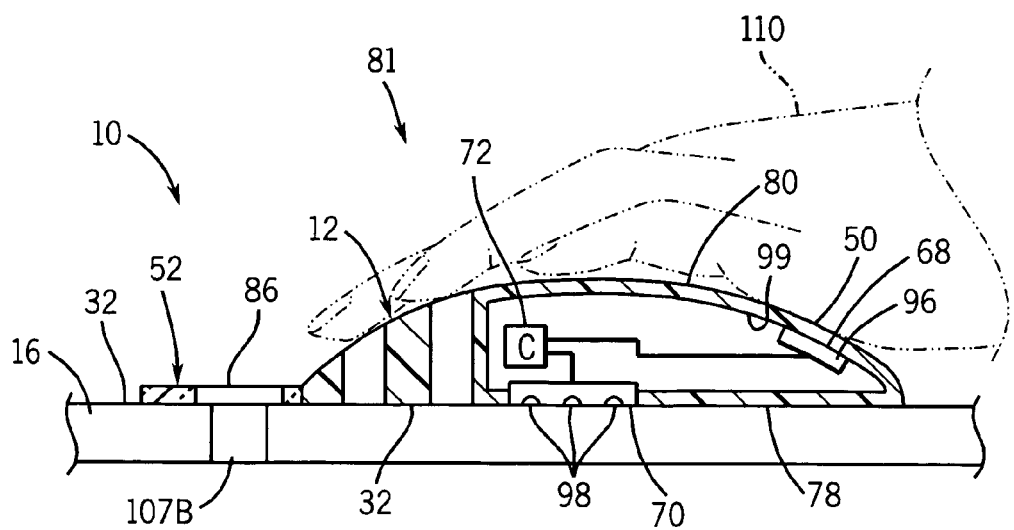
FIG. 2 is an enlarged fragmentary sectional view of the system of FIG. 1 taken along line 2-2 according to one exemplary embodiment.
Figure 3:
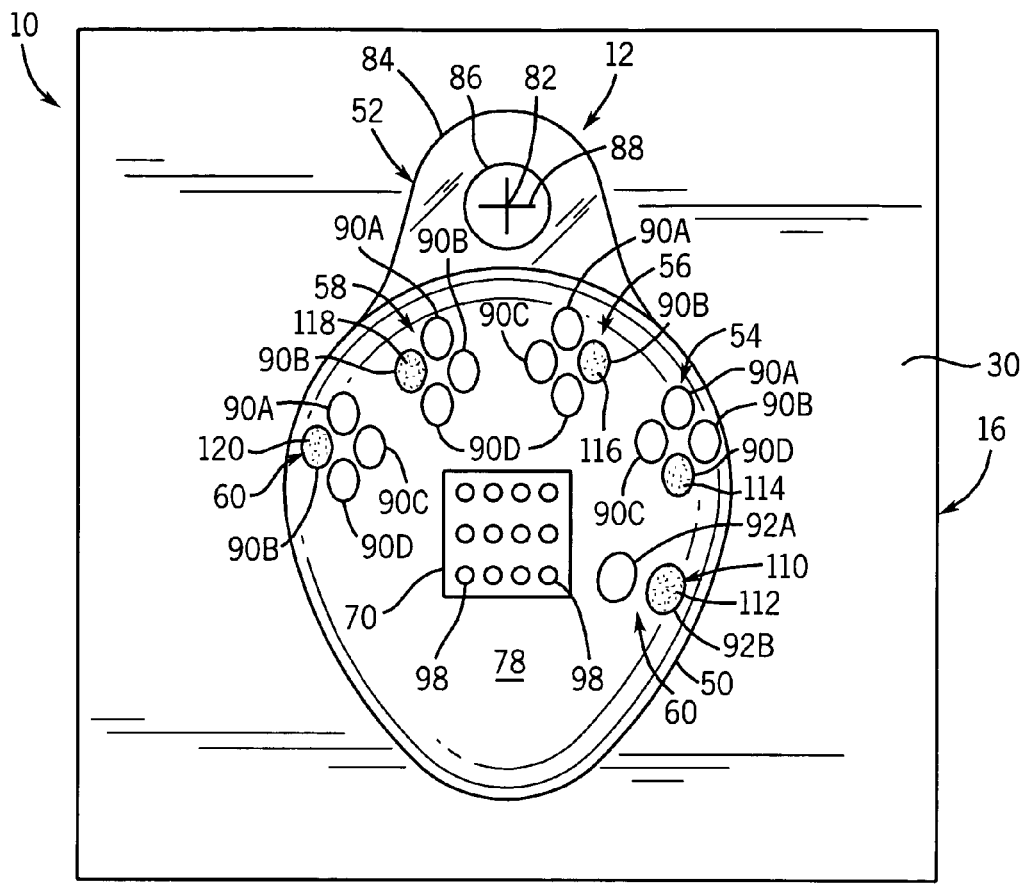
FIG. 3 is a bottom plan view of the system of FIG. 2 according to one exemplary embodiment.
Figure 4:
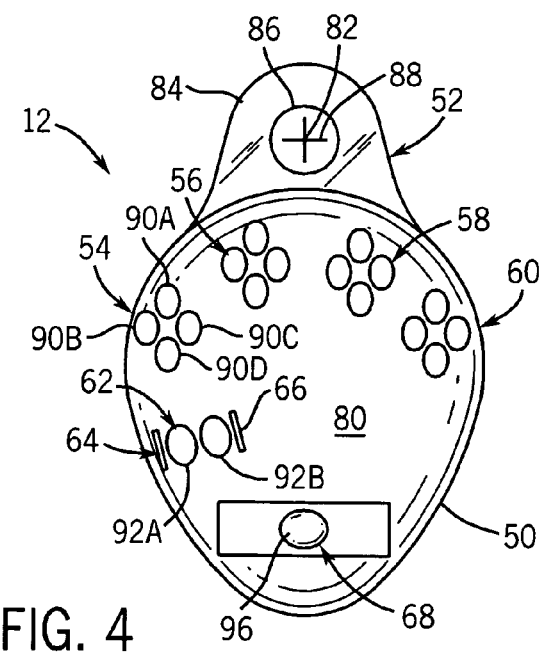
FIG. 4 is a top plan view of the system of FIG. 2 according to one exemplary embodiment.

FIGS. 2-4 illustrate input device 12 in greater detail. FIG. 2 is a sectional view of input device 12 resting upon screen 16. FIG. 3 is a bottom view of input device 12 resting upon screen 16 and FIG. 4 is a top plan view of input device 12. As shown by FIGS. 3 and 4, input device 12 includes body 50, position reference 52, hand interaction structures 54, 56, 58, 60, 62, 64, 66, 68, optical electromagnetic radiation emitter 70 (shown in FIGS. 2 and 3) and controller 72 (shown in FIG. 2). Body 50 comprises a structure supporting and/or defining the remaining components of input device 12. Body 50 generally includes a first surface 78 and opposite surface 80. Surface 78 is generally configured so as to be placed against surface 32 of screen 16. In the particular example shown, surface 78 is configured to reflect optical electromagnetic radiation directed at it by projector 18 or from other optical electromagnetic radiation sources. In the particular example shown, surface 78 is configured to be slid across surface 32 during movement of input device 12. In other embodiments, surface 78 may be configured to be lifted and placed against surface 32 or to be rolled along surface 32. In one embodiment, movement of input device 12 may be further facilitated by rollers or other low friction interfaces. Although surface 78 is illustrated as being generally flat along an entire underside of body 50 such that the entirety of surface 78 abuts surface 32, surface 78 may alternatively include portions raised or spaced from surface 32 by pads, rails and the like.

Surface 80 of body 50 generally extends opposite to surface 78 and is configured to be physically contacted by a person's hand. In the particular example shown, at least a portion of surface 80 is convex so as to project into and be received within a concave portion of a palm. Surface 80 further conforms to a natural arc of a lower surface of the fingers of a hand. As a result, surface 80 facilitates a natural resting position of a person's hand upon body 50 and upon screen 16 as information is input by device 12 from interaction with a person's hand. In other embodiments, surface 80 may have other configurations and may be less ergonomic.

Position reference 52 comprises a structure configured to facilitate precise positioning of input device 12 with respect to screen 16. Position reference 52 is coupled to body 50 and includes a precise point 82 that may be precisely located with respect to screen 16 and that is viewable from side 81 of input device 12. In the particular example shown, position reference 52 includes an elongate projection 84 having a translucent window 86 and a cross-hair 88 formed upon the translucent material of window 86. Cross-hair 88 defines point 82. In one embodiment, cross-hair 88 is printed upon window 86. In another embodiment, cross-hair 88 may be etched or otherwise marked on window 86. Position reference 52 facilitates the positioning of input device 12 at a precise position relative to screen 16 by aligning point 82 with an image formed upon screen 16 by projector 18 or with other markings or indicia otherwise formed upon screen 16.

Although position reference 52 is illustrated as including window 86 having a cross-hair 88 defining point 82, position reference 52 may alternatively provide a precise point 82 in other fashions. For example, in lieu of cross-hairs 88 forming point 82, point 82 may be formed or indicated by one or more arrows, bulls eyes, circles and the like formed on the material of window 86. In still other embodiments, point 82 may be formed along a perimeter of projection 84. For example, projection 84 may alternatively include a pointed perimeter which defines point 82 for precise positioning with respect to screen 16. In particular embodiments, cross-hairs 88 may be omitted where the size or configuration of window 86 is sufficient to position indicator 12 with respect to a marking or image upon screen 16 to a sufficient degree.

Hand interaction structures 54-68 comprise structures configured to be interacted upon by a person's hand such that different optical electromagnetic radiation is given off by input device 12. Hand interaction structures 54-66 are configured to be interacted upon by digits (4 fingers and a thumb) of a person's hand. Hand interaction devices 54-60 are configured to be acted upon by fingers of a person's hand. In particular, hand interaction device 54 is configured to be interacted upon by a person's index finger. Hand interaction structure 56 is configured to be interacted upon by a person's middle finger. Hand interaction structure 58 is configured to be interacted upon by a person's ring finger and hand interaction structure 60 is configured to be interacted upon by a person's pinky. In the particular example shown, each of hand interaction structures 54-60 include four translucent portions including a forward translucent portion 90A, an outer side translucent portion 90B, an inner side translucent portion 90C and a rearward portion 90D (collectively referred to as translucent portions 90). Translucent portions 90 comprise translucent passageways generally extending from surface 78 to surface 80 as seen in FIG. 2. Translucent portions 90 are arranged so as to be selectively blocked by fingers of a person's hand. When blocked, optical electromagnetic radiation is reflected from surface 78 (and the person's hand) differently as compared to when a particular one of portions 90 is not blocked. Because hand interaction structures 54-60 each include four such translucent portions 90 for each finger, a multitude of different combinations or different portions 90 may be selectively blocked by one or more fingers of a person's hand. This multitude of potential combinations enables multiple different inputs of information to be communicated by input device 12.

Although hand interaction structures 54-60 are each illustrated as including four such translucent portions 90, hand interaction structures 54-60 may alternatively include a greater or fewer number of such translucent portions 90. In the particular example shown, each translucent portion 90 comprises a column of translucent or transparent material extending between surfaces 78 and 80. In other embodiments, translucent portions 90 may alternatively comprise apertures or passages extending between surfaces 78 and 80. In particular embodiments, such apertures may be configured to receive portions of a person's finger when being blocked.

Hand interaction structures 62-66 are configured to be interacted upon by a person's thumb. Hand interaction structure 62 is configured to interact with a thumb of a person's hand. Hand interaction structure 62 includes a pair of laterally spaced translucent portions 92A and 92B (collectively referred to as "translucent portions 92"). Translucent portions 92 comprise portions between surfaces 78 and 80 which are translucent or transparent and configured to be blocked by selective positioning of a person's thumb. Translucent portions 92 are configured such that optical electromagnetic radiation reflected from surface 78 (and potentially the person's thumb) will vary depending upon whether a person's thumb is blocking portions 92A, 92B or neither 92A or 92B. In one embodiment, translucent portions 92A and 92B comprise columns of translucent or transparent material. In another embodiment, portions 92A and 92B comprise apertures extending between surfaces 78 and 80. In one embodiment, such apertures may be configured to be configured to at least partially receive a tip or other portion of a person's thumb.

Hand interaction structures 64 and 66 are also configured to interact with a thumb of a person's hand. Hand interaction structures 64 and 66 comprise sensors which communicate signals to controller 72 based upon interaction with a person's thumb. In the example shown, hand interaction structure 64 extends along surface 80 to an outside of translucent portion 92A. Hand interaction structure 66 extends along surface 80 to an inside of translucent portion 92B. According to one embodiment, hand interaction structures 64 and 66 comprise pressure sensors facing one another such that outward force by a person's thumb against pressure sensor 64 causes a first signal to be communicated to controller 72 (shown in FIG. 2) and such that an inward force applied by a thumb to pressure sensor 66 causes a second signal to be communicated to controller 72. In other embodiments, hand interaction structures 64 and 66 may comprise other forms of sensors such as optical sensors and the like and may be provided at other locations. For example, hand interaction structures comprising sensors may alternatively be positioned proximate a front or rear of translucent portions 92A and 92B or above translucent portions 92A and 92B so as to bridge one or both of translucent portions 92A, 92B and to interact with a top of a thumb. Although hand interaction structures 64 and 66 are illustrated as being configured to interact with a person's thumb proximate to hand interaction structure 62, hand interaction structures 64 and 66 may alternatively be configured to interact with other digits of a person's hand. For example, hand interaction structures 64 and 66 may alternatively be provided proximate to hand interaction structures 54, 56, 58 and/or 60. In particular embodiments, hand interaction structures 64 and 66 may comprise sensors configured to transmit different signals depending upon the extent of pressure applied by a person's digit. In some embodiments, hand interaction structures 64 and 66 may comprise levers, switches, buttons or the like configured to be actuated by a person's thumb or other digits at other locations on input device 12.

Hand interaction structure 68 comprises a structure configured to interact with a base of a palm. In the particular example shown, hand interaction structure 68 transmits signals to controller 72 based upon such interaction. In another embodiment, hand interaction structure 68 acts as a switch and automatically actuates emitter 70 in response to such interaction. In the particular shown, hand interaction structure 68 comprises a sensor configured to transmit signals to controller 72. In one embodiment, hand interaction structure 68 includes an individual sensor pad 96 along surface 80 proximate a rear of body 50 generally opposite to position reference 52. The depressment of pressure sensitive pad 96 causes signals to be transmitted to controller 72.

As shown by FIG. 4, hand interaction structures 54-68 are arranged along surface 80 such that each may be generally simultaneously interacted upon by different portions of a person's hand. In the particular example shown, hand interaction structures 54-68 are arranged such that each may be simultaneously interacted upon by different portions of a person's hand without substantial or unnatural extension, retraction or positioning of a person's hand. In the particular example illustrated, hand interaction structures 54-68 are configured such that they may be simultaneously interacted upon by different portions of a person's hand while the hand remains substantially resting upon and supported by body 50 of input device 12.

Emitter 70 (shown in FIGS. 2 and 3) comprises a structure configured to emit optical electromagnetic radiation based upon interaction of a person's hand with hand interaction structures 64, 66 and 68. In the example shown, emitter 70 is located along surface 78 such that optical electromagnetic radiation emitted by emitter 70 passes through screen 16 and may be sensed by sensor 20. In the particular example shown, emitter 70 is configured to emit light and more particularly, infra-red light in response to interaction with structures 64, 66 and 68. In another embodiment, emitter 70 is configured to emit visual light. In the particular example shown, emitter 70 includes a matrix of light-emitting diodes 98 arranged along surface 78. In response to different hand interactions with structures 64, 66 and 68, different combinations or patterns of diodes 98 are lit up or otherwise emit optical electromagnetic radiation. In one embodiment, depending upon hand interaction with structures 64, 66 and 68, diodes 98 also emit optical electromagnetic radiation having differing characteristics. For example, in response to a first hand interaction with structures 64, 66 and 68, one or more of diodes 98 may omit a first color light and in response to a second different hand interaction with one or more structures 64, 66 and 68, one or more of diodes 98 may omit a second color light. Because emitter 70 is configured to emit different patterns of optical electromagnetic radiation as well as optical electromagnetic radiation having different characteristics, emitter 70 may communicate multiple commands or instructions based upon interaction with a person's hand. In the particular example shown, each individual diode 98 may be selectively actuated to emit light and the color of the light may be varied, enabling emitter 70 to emit greater than 2 and over 100 different combinations.

Although emitter 70 is illustrated as comprising a generally rectangular matrix of 12 light-emitting diodes 98, emitter 70 may alternatively comprise other matrix configurations having a greater or fewer number of such light-emitting diodes. Although emitter 70 includes multiple individual emitting elements, such as diodes 98, emitter 70 may alternatively include a single emitting element which can communicate by being on or off or which can communicate by emitting optical electromagnetic radiation having different characteristics, such as visual light having different colors. Although emitter 70 is configured to emit visual light, emitter 70 may alternatively be configured to emit other forms of optical electromagnetic radiation.

As schematically illustrated in FIG. 2, controller 72 comprises a processing unit configured to communicate with hand interaction structure 68 and emitter 70. Controller 72 is further configured to communicate with hand interaction structures 64 and 66. In particular, controller 72 includes a processing unit and an associated memory which provides stored or hardwired instructions for the processor of controller 72. Controller 72 is configured to generate control signals based upon signals received from one or more of hand interaction structures 64, 66 and 68 as well as based upon the lack of signals received from one or more of structures 64, 66 and 68. Such control signals direct emitter 70. In particular, such control signals cause emitter 70 to emit different patterns of optical electromagnetic radiation and/or optical electromagnetic radiation having differing characteristics. In one embodiment, controller 70 comprises a processing unit supported on a printed circuit board within an interior cavity 99 of body 50. In other embodiments, controller 72 may be positioned at other locations or supported by other structures. In some embodiments, controller 72 may be omitted where hand interaction structures 64, 66 and/or 68 are configured as switches for emitter 70 such that interaction with structures 64, 66 and 68 automatically causes emitter 70 to emit optical electromagnetic radiation or to vary the optical electromagnetic radiation being emitted. For example, in one embodiment, structures 64, 66 and 68 may be configured as electrical power switches such that upon being interacted upon, structures 64, 66 and 68 electrically connect emitter 70 to a power source such as a battery housed within body 50.

FIG. 1 illustrates one example of an operating scenario for system 10. As shown by FIG. 1, controller 22 generates control signals directing projector 18 to emit or project visual light 105 which is reflected off of mirror 38 and onto screen 16 to form a visual image upon screen 16. The image upon screen 16 may be stationary or may exhibit motion such as animation. A portion of the image formed upon screen 16 by light 105 comprises one or more position indicators 107.

Position indicators 107 indicate the suggested positioning of input device 12 with respect to screen 16 and the image formed upon screen 16. Each of indicators 107 may comprise a circle, square or other shape or structure which may otherwise suggest to a person the orientation or positioning of a suggested orientation or positioning of input device 12. In one embodiment, indicators 107 may comprise circles, bull's eyes, cross-hairs, arrows and the like.

In the particular example shown, controller 22 generates control signals directing projector 18 to project light 105 such that the image formed upon screen 16 includes multiple position indicators 107A, 107B and 107C (collectively referred to as indicators 107). Each position indicator 107 may correspond to a particular input or selection that a person may choose using input device 12. In particular, the person may choose one of the options or selections by appropriately positioning input device 12 with respect to a chosen one of indicators 107 using position reference 52.

As shown by FIGS. 1 and 2, position reference 52 facilitates the positioning of input device 12 with respect to one of indicators 107. In the example shown, window 86 is positioned over indicator 107B such that indicator 107B may be viewed through window 86. In the example shown in which reference 52 includes cross-hairs 88 providing a reference point 82, reference point 82 may be precisely positioned with respect to a precise point, arrow tip or a cross-hair of the chosen indicator 107B. In the particular example shown, the person has chosen the option or command associated with indicator 107B by positioning position reference 52 of input device 12 over and in appropriate alignment with indicator 107B.

As shown by FIG. 3, body 50 of input device 12 has a unique shape or configuration when placed against screen 16. In one embodiment, processor 42, following instructions contained in memory 44, may be configured to recognize input devices having a particular shape and to disregard other input shut devices not having a predetermined configuration or shape as sensed by sensor 20. In other embodiments, controller 22 may be configured to perform different operations or commands depending upon a shape or configuration of body 50 of input device 12. For example, controller 22 may execute a first command in response to an input device 12 having a first configuration being positioned against screen 16 and may execute a second command in response to a second input device 12 having a different shape or configuration being placed against screen 16. In still other embodiments, controller 22 may be configured to perform different commands in response to a particular movement of input device 12. For example, in one embodiment, controller 22 may be configured to execute a first command in response to input device 12 being rotated in a counterclockwise direction and to execute a second distinct command in response to input device 12 being rotated in a clockwise direction while being positioned against screen 16 and as sensed by sensor 20.

FIG. 3 further illustrates a person's hand 110 interacting with each of hand interaction structures 54-62. In the example shown, a person's thumb 112 is positioned so as to block translucent portion 92B while translucent portion 92A remains clear. The person's index finger 114 is positioned so as to block translucent portion 90D of hand interaction structure 54 while portions 90A-90C remain clear. The person's middle finger is positioned so as to block translucent portion 90B of hand interaction structure 56 while portions 90A, 90C and 90D remain clear. The person's ring finger 118 is positioned so as to block translucent portion 90B of hand interaction structure 58 while translucent portions 90A, 90C and 90D remain clear. The person's pinky 120 is positioned so as to block translucent portion 90B of hand interaction structure 60 while translucent portions 90A, 90C and 90D remain clear.

As shown by FIG. 1, a portion 130 of the optical electromagnetic radiation (visual light) projected by projector 18 at screen 16 reflects off of surface 78 and digits 112-120, and is sensed by sensor 20. The visual light 130 reflects off of those translucent portions 90A-90D that are blocked differently as compared to those translucent portions 90A-90D that are clear. As a result, the visual light or other optical electromagnetic radiation reflected off of surface 78 may have one of many possible configurations or patterns depending upon which translucent portions 90A-90D of hand interaction structures 54-60 and translucent portions 92A and 92B of hand interaction structure 62 are being blocked by the digits of hand 110. Differing patterns of reflected optical electromagnetic radiation are sensed by sensor 20 and signals are transmitted to controller 22.

Processor 42 of controller 22 may act upon such signals based upon the instructions contained in memory 44 by generating control signals that cause projector 18 to project a different image upon screen 16. Processor 42 may generate other control signals for operating other components of system 10 based upon such signals. In addition, processor 42 may record or store information or perform calculations based upon signals received from sensor 20 alone or in combination with other signals received from other devices.

Although FIG. 1 illustrates visual light 130 as being provided by projector 18 and as being reflected off of input device 12 and sensed by sensor 20, visual light 130 may be supplied by other sources of visual light in addition to or as an alternative to projector 18. In addition, other forms of optical electromagnetic radiation may alternatively be directed at and reflected off of surface 78 of input device 12 such as infrared or ultraviolet light, wherein sensor 20 is configured to sense such other forms of reflected light.

FIG. 2 illustrates hand 110 further interacting with hand interaction structure 68. In particular, FIG. 2 illustrates the base of the palm of hand 110 pressing against sensor 96. As a result, sensor 96 transmits signals to controller 72 and controller 72 generates control signals directing emitter 70 to generate and emit optical electromagnetic radiation such as visual light. In the particular example illustrated, sensor 96 transmits signals to controller 72 based upon the amount of pressure applied to it by hand 110. Based upon the signals from sensor 96, controller 72 generates control signals causing selected diodes 98 of emitter 70 to be lit. As a result, emitter 70 presents a unique pattern of lit diodes 98 along surface 78 based upon interaction of hand 110 with input device 12.

As shown by FIG. 1, the lit pattern of diodes 98 causes a corresponding pattern of visual light 132 to be generated and transmitted to sensor 20. Based upon the pattern of visual light 132 received by sensor 20, sensor 20 transmits signals to controller 22. Based upon such signals, processor 42 of controller 22 may generate control signals according to instructions provided in memory 44 or causing projector 18 to display or alter its image upon screen 16. Processor 42 may also generate control signals for the direction of other components of system 10 or other components outside system 10. In addition, processor 42 may perform calculations and/or store information in memory 44 based upon signals received from sensor 20.

Although the above operating scenario has been described with respect to interactions of hand 110 with respect to sensor 96 of hand interaction structure 68, controller 72 may also generate control signals causing emitter 70 to selectively light diodes 98 based upon signals received from the sensing components of hand interaction structures 64 and 66. For example, the thumb of hand 110 may press against pressure sensing components of hand interaction structure 64 or alternatively hand interaction structure 66. Based upon such interactions, the sensing components of hand interaction structures 64 and 66 may transmit signals to controller 72 which generates control signals for directing emitter 70 based upon such signals. Thereafter, upon receiving light 132 emitted from emitter 70, sensor 20 may transmit signals to controller 22 and controller 22 may act upon such signals as noted above.

Figure 5:
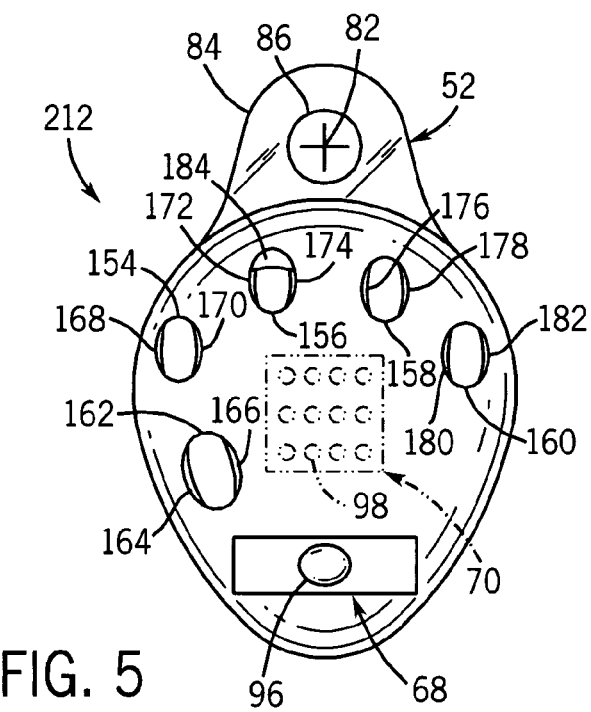
FIG. 5 is a top plan view of another embodiment of an input device of the system of FIG. 1 according to one exemplary embodiment.
Figure 6:
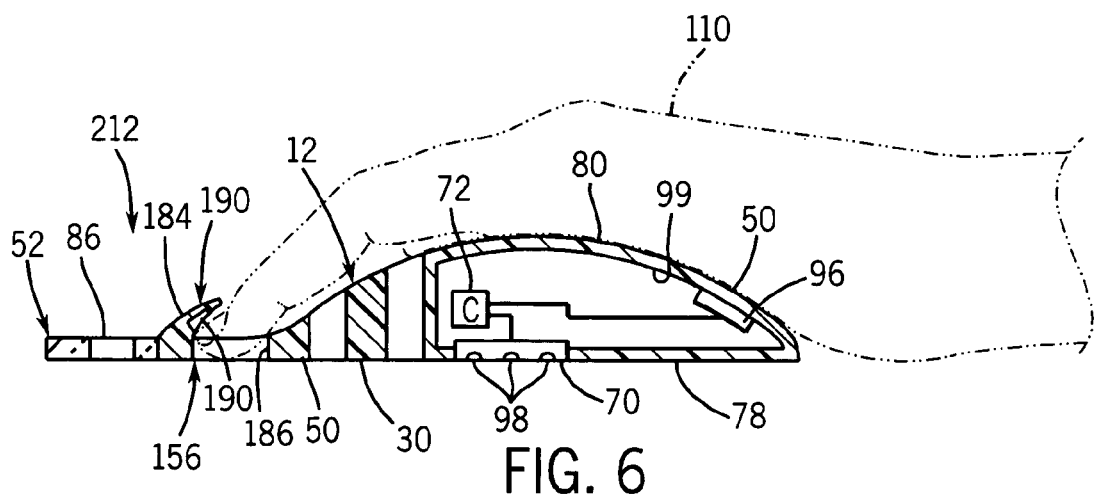
FIG. 6 is a sectional view of the input device of FIG. 5 according to one exemplary embodiment.

FIGS. 5 and 6 illustrate input device 212, another embodiment of input device 12. Input device 212 is similar to input device 12 except that input device 212 includes hand interaction structures 154, 156, 158, 160 and 162 in lieu of hand interaction structures 54, 56, 58, 60 and 62, respectively. In lieu of hand interaction structures 64 and 66, input device 12 includes hand interaction structures 164, 166, 168, 170, 172, 174, 176, 178, 180, 182 and 184. Those remaining components of input device 212 which correspond to the components of input device 12 are numbered similarly.

Hand interaction structures 154-162 are configured to interact with digits of a person's hand such as hand 110 shown in FIG. 6. In the particular example illustrated, hand interaction structures 154, 156, 158 and 160 are located and spaced from one another for simultaneous interaction with an index, middle finger, ring finger and pinky of a person's hand. As shown by FIG. 6, in the particular example illustrated, each of hand interaction structures 154-160 comprises a depression, pit, cavity or well 186 configured to receive the bottom surface, tip or other outer extremity of a digit of hand 110. Because each of hand interaction structures 154-162 comprises a depression, cavity, pit or well, a person is provided with a positive feel and indication as to positioning of his or her digits so as to block the translucent portion provided by each of structures 154-162. As discussed above with respect to FIG. 1, optical electromagnetic radiation, such as visual light 130 projected by projector 18, reflects off of surface 78 (and off of digits differently depending upon whether the transparent portion of hand interaction structures 154-162 are blocked by a person's digit or remain clear. As a result, by selectively positioning his or her thumb and fingers in the openings of hand interaction structures 154-162, a person may cause different patterns of reflected optical electromagnetic radiation (visual light) to be received by sensor 20. Sensor 20 transmits signals to controller 22 based upon the received pattern or characteristics of optical electromagnetic radiation reflected from input device 212. Thereafter, controller 22 generates control signals, performs calculations or stores information based upon such signals from sensor 20.

According to one embodiment, sensor 20 is further configured to transmit different signals to controller 22 based upon the depth that a particular digit is inserted into well 186 and/or the rate at which a digit is raised or lowered within well 186. In particular, the depth at which a digit is inserted into well 186 or the rate at which a digit is moved within well 186 will affect the characteristics of optical electromagnetic radiation (visual light) being reflected off of the digit. Sensor 20 is configured to detect such variations in the reflected optical electromagnetic radiation to transmit signals which vary based upon such detected differences. Based upon such signals, controller 22 generates different control signals, performs different calculations or stores different information.

Hand interaction structures 164-182 comprise individual sensors located proximate to each of hand interaction structures 154-162. In the particular example shown, hand interaction structures 164-182 are located within and along opposite sides of each of wells 186 of hand interaction structures 154-162. In the particular example illustrated, each of hand interaction structures 164-182 comprise pressure sensors configured to be outwardly depressed by a digit positioned within well 186. Upon being sufficiently moved or depressed, the pressure sensing components of structures 164-182 transmit signals to controller 72 (shown in FIG. 6). Based upon such signals, controller 72 generates control signals directing emitter 70 to selectively light one or more of diodes 98 or to selectively vary characteristics of light emitted by diodes 98. Upon receiving the emitted light, sensor 20 (shown in FIG. 1)

transmits signals to controller 22. Processor 42 of controller 22 may generate control signals, form calculations and/or store information in memory 44.

Although input device 212 is illustrated as having a pair of hand interaction structures on opposite sides of each well 186 of each of hand interaction structures 154-162, input device 212 may alternatively include greater or fewer of such hand interaction structures 164-182.

Hand interaction structure 184 comprises a mechanism configured to interact with upper surface of hand 110 communicating input to system 10 (shown in FIG. 1). In the particular example shown, hand interaction structure 184 is configured to interact with the top surface of a tip of a digit which is a person's middle finger. Hand interaction structure 184 includes a projecting support structure 188 which supports a sensor 190. Support 188 elevates or suspends sensor 190 generally above well 186 and above tip of a digit positioned within well 186.

Sensor 190 comprises a sensing device configured to sense interaction with an upper surface of the tip of a digit within well 186. In one embodiment, sensor 190 comprises a pressure sensor such that force exerted against sensor 190 causes sensor 190 to transmit signals to controller 72 (shown in FIG. 2). In one embodiment, sensor 190 is configured to transmit different signals based upon the amount or extent of pressure applied against it. Upon receiving such signals from sensor 190, controller 72 generates control signals causing emitter 70 (shown in FIG. 2) to selectively light one or more of diodes 98 and/or to cause diodes 98 to emit a selected color. The visual light emitted by diodes 98 is transmitted and received by sensor 20 (shown in FIG. 1). Based upon the visual light received, sensor 20 transmits signals to processor 42 which may generate control signals, perform calculations and/or store information based upon such signals from sensor 20.

Although input device 212 is illustrated as including hand interaction structure 188 configured to interact with a person's middle finger, the device 212 may additionally include additional hand interaction structures similar to hand interaction structure 184 for each of the remaining digits of a person's hand. Although input device 212 is illustrated as including hand interaction structures 154-162, hand interaction structures 164-182, hand interaction structure 184 and hand interaction structure 68, input device 12 may alternatively include a greater or fewer number of such hand interaction structures. For example, in another embodiment, input device 212 may omit hand interaction structures 154-162 while including hand interaction structures 164-182. In such an embodiment, wells 186 may comprise closed or blind depressions that facilitate location of a person's digits with respect to hand interaction structures 164-182. In still other embodiments, hand interaction structures 164-182 may be omitted or hand interaction structure 184 may be omitted or increased in number.

Overall, input devices 12 and 212 facilitate multiple inputs to receiving device 14 through interaction with a person's hand. Such inputs may be made while input device 12 is stationary with respect to receiving device 14. In the particular example shown, such input may be made without wires connected to input devices 12 or 212. At the same time, input devices 12 and 212 are well suited for use in vision systems which sense optical electromagnetic radiation and which may utilize a projector projecting an image upon a screen.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An input device comprising:
   a body configured to be positioned against a display screen; and
   a hand interaction structure associated with the body and configured such that different optical electromagnetic radiation is given off and directed through the display screen based upon interaction with a hand, wherein the hand interaction structure comprises wells configured to receive digits and to be selectively blocked by the digits, wherein the different optical electromagnetic radiation is given off and directed through the display screen based upon different blocking of the wells by the digits.

2. The device of claim 1, wherein the hand interaction structure comprises a pressure sensor configured to interact with at least one of a base of a palm or a digit.

3. The apparatus of claim 1, wherein the hand interaction structure includes a plurality of translucent portions corresponding to a single digit and configured to be selectively blocked by the single digit and wherein the device further comprises a light emitting diode configured to emit optical electromagnetic radiation differently based upon what translucent portions are blocked by the digit.

4. The device of claim 1, wherein the body is configured to reflect optical electromagnetic radiation based upon interaction of a person's hand with the hand interaction structure.

* * * * *